(12) United States Patent
Gonidec et al.

(10) Patent No.: US 6,274,216 B1
(45) Date of Patent: Aug. 14, 2001

(54) HONEYCOMB STRUCTURE, PARTICULARLY FOR ABSORBING SOUND AND ITS PRODUCTION PROCESS

(75) Inventors: Patrick Gonidec, Montivilliers; Jean Adam Roger Treger, Fontaine La Mallet, both of (FR)

(73) Assignee: Hispano Suiza Aerostructures, Gonfreville L'Orcher (FR)

( * ) Notice: Subject to any disclaimer, the term of this patent is extended or adjusted under 35 U.S.C. 154(b) by 0 days.

(21) Appl. No.: 09/358,483

(22) Filed: Jul. 22, 1999

(30) Foreign Application Priority Data

Jul. 30, 1998 (FR) .................................................. 98 09743

(51) Int. Cl.$^7$ ....................................................... B32B 3/12
(52) U.S. Cl. ........................................... 428/116; 156/197
(58) Field of Search ..................................... 428/116, 118; 156/197

(56) References Cited

U.S. PATENT DOCUMENTS

| 4,265,955 | 5/1981 | Harp et al. | 428/116 |
| 5,785,919 | 7/1998 | Wilson | 264/401 |

FOREIGN PATENT DOCUMENTS

| 2 261 872 | 9/1975 | (FR) . |
| 2 660 787 | 10/1991 | (FR) . |
| 52-141010 | * 11/1977 | (JP) . |
| WO 92/12856 | 8/1992 | (WO) . |

* cited by examiner

Primary Examiner—Francis J. Lorin
(74) Attorney, Agent, or Firm—Oblon, Spivak, McClelland, Maier & Neustadt, P.C.

(57) ABSTRACT

A conventional honeycomb structure is strengthened by intermediate membranes (13), which compartmentalize the cells (5) in the height-wise direction. Such a structure more particularly has an increased mechanical strength and high damping properties for Helmholtz resonators intended to trap sound waves arriving on the structure by a perforated face (1).

41 Claims, 3 Drawing Sheets

Figure 4:
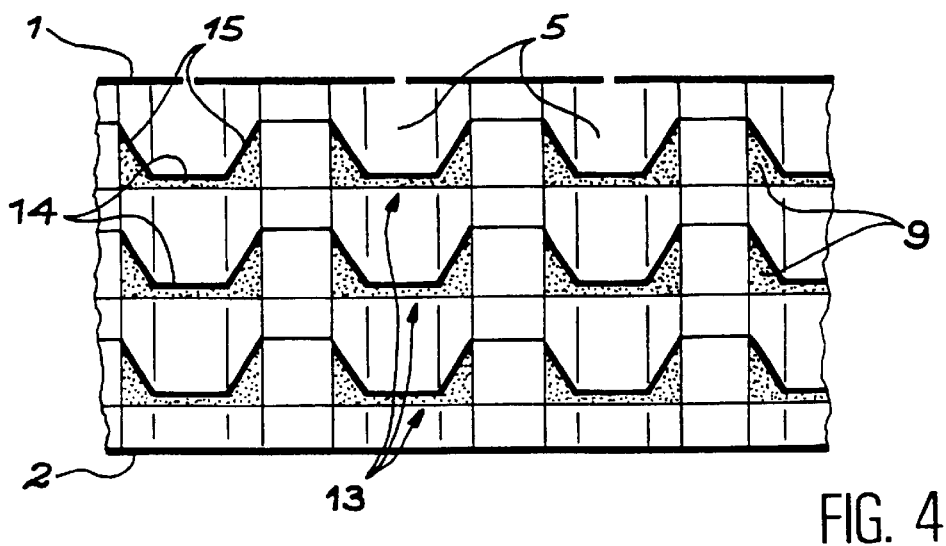

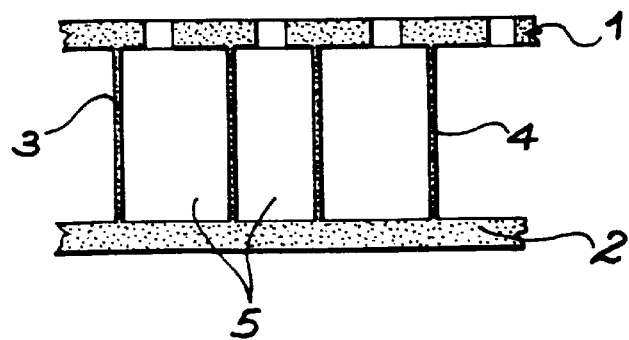
FIG. 1
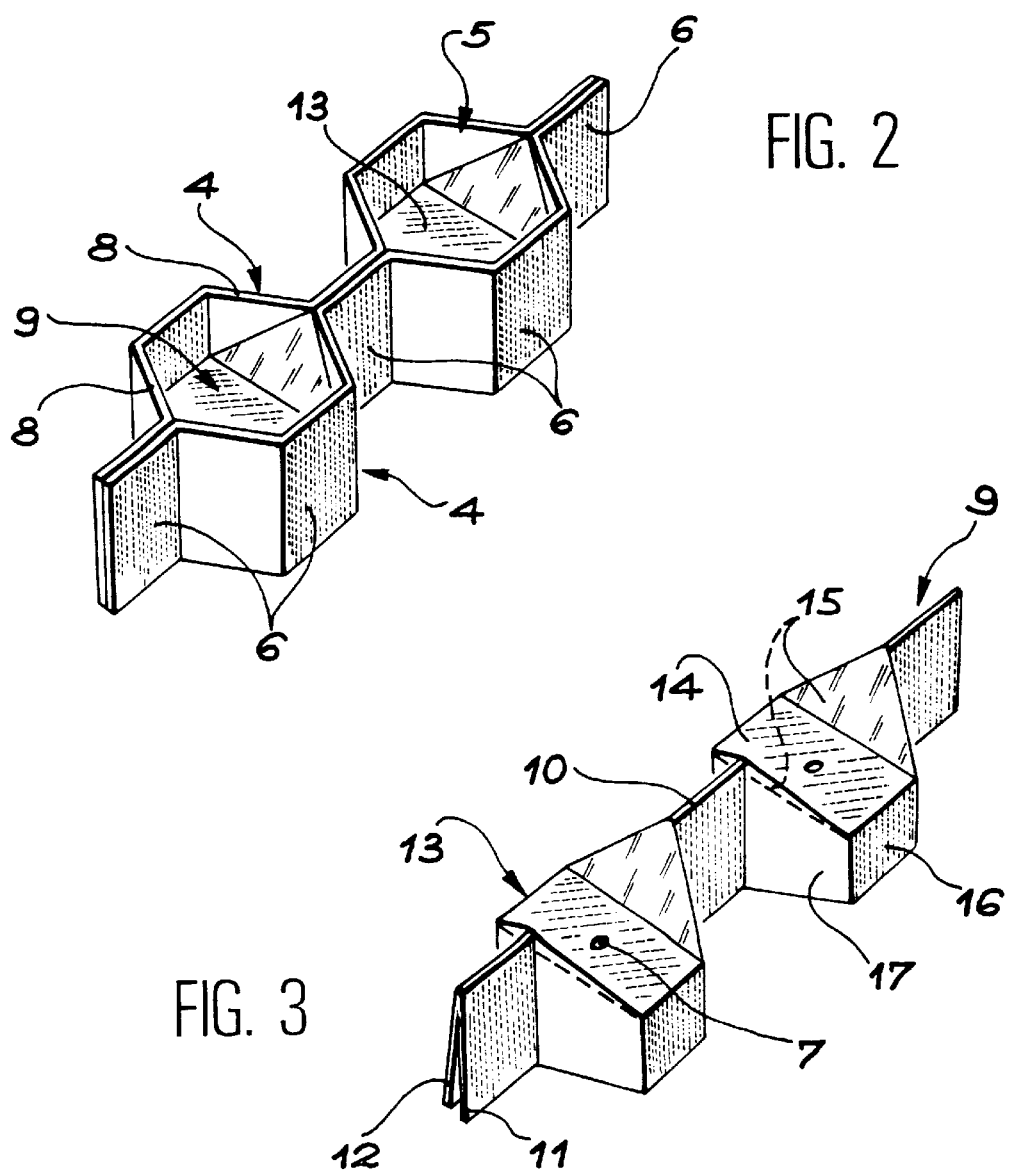
FIG. 2
FIG. 3

HONEYCOMB STRUCTURE, PARTICULARLY FOR ABSORBING SOUND AND ITS PRODUCTION PROCESS

The present invention is directed at an improved honeycomb structure mainly suitable for the construction of soundproofing panels, as well as to its production process.

A known soundproofing structure is in the form of a panel constituted by honeycomb cells intercalated between a solid plate and a perforated plate by which the cells open towards the noisy medium. Sound waves propagate in the cells passing through the perforations and are absorbed there by successive reflections on the walls without really being able to pass out of the same. This structure is known as a Helmholtz resonator.

It is possible to stack two layers of such cells by intercalating a perforated plate or sheet in order to separate them and whilst maintaining the communication between them. A continuous plate is then placed at the rear of the stack and a perforated plate at the front. Thus, the sound waves enter the first layer of cells and then the second, which improves the absorption of sound. This structure is known as a Helmholtz resonator with two degrees of freedom. As a variant, the perforated separating plate or sheet can be replaced by a wire gauze, which is bonded between the layers of cells or a perforated sheet separating them.

A disadvantage of such more complex structures is that the assemblies of the layers of cells and sheets or gauze are generally fragile and sometimes difficult to implement in a satisfactory manner. As it is often also necessary to bend or deform in a random manner the panels before being able to use them in equipment, shear stresses appear, which are higher in the interior of the panel than on the surface thereof, which explains why it readily tears at its interfaces between layers of cells. This situation is further aggravated if bending is accompanied by tension or compression and if it occurs around two length and width directions, or if the interface of the layers is not at the mid-thickness of the structure, because the neutral line of the stresses is spaced from the interface, which is then more greatly loaded.

It is possible to obviate these disadvantages by separately deforming the layers of cells and then assembling them, which eliminates the shear stresses at the interfaces, but the adjustment of the layers of cells is even more complicated and it is necessary to ensure that forming takes place with adequate precision to permit such an adjustment.

The essential feature of the invention is that the metal plate by which the layers of cells are conventionally separated is replaced by initially folded sheets, which make it possible to obtain successive layers of cells with a much greater ease of manufacture without greatly stiffening the structure, so that high stresses neither appear, nor are received. Thus, the separating sheets of the cells can be much thinner than the plates or gauzes conventionally used, because they are not exposed to breaking risks either at the time of manufacture or subsequently and also has no function in the assembly of the structure.

Thus, in its most general form, the invention relates to a structure formed from main sheets, of a sinuous nature and alternatively joined by straight edges to two neighbouring, opposite, main sheets, whilst defining cells having a hexagonal cross-section, characterized in that it comprises sheets intermediate with respect to the main sheets, which are folded and joined to straight edges of two neighbouring, main sheets, whilst forming broken fold membranes in the cells. The broken fold introduced here is an initially formed fold, but which decreases or disappears during the manufacture of the structure.

The intermediate sheets can be porous, perforated, continuous, flexible, semi-rigid, or in composite form, thin sheet, gauze, etc. Several examples appropriate for the construction of Helmholtz resonators will be given.

The invention also relates to a process for the production of such a structure, characterized in that it consists of longitudinally folding the intermediate sheets in order to form there two lips separated by a fold, alternately stacking the main and intermediate sheets, whilst joining first faces of the main sheets alternately to two neighbouring, main sheets, at locations intended to give straight edges, and second faces, opposite to the first faces, of main sheets to intermediate sheet portions, said portions belonging to a single lip among the two lips and being spaced from the fold.

Embodiments of the invention are described in greater detail hereinafter relative to the attacked drawings, wherein show:

FIG. 1 A Helmholtz resonator.

FIG. 2 A perspective view of the presently proposed honeycomb structure.

FIG. 3 An isolated view of cell separating sheets in an embodiment of the invention.

FIG. 4 A Helmholtz resonator with several degrees of freedom.

Figure 5:
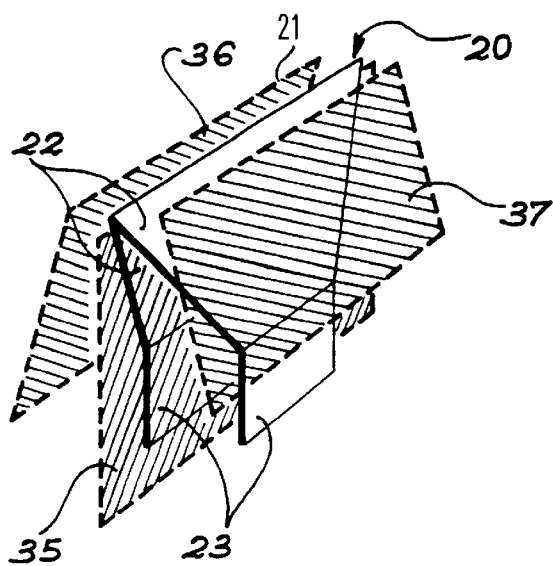
Figure 6:
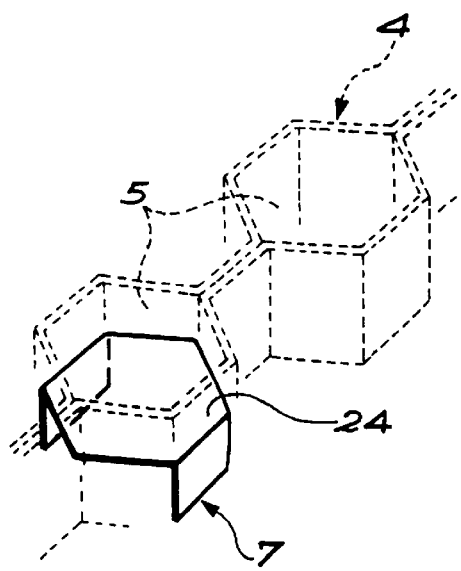

FIGS. 5 & 6 The characteristic element of another embodiment of the invention, before and after opening the cells.

Figure 7:
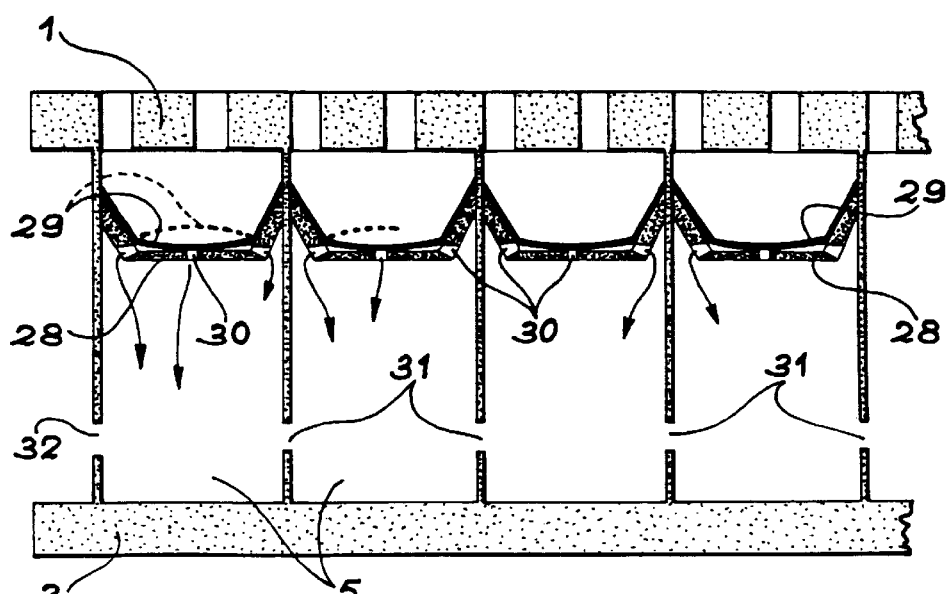
Figure 8:
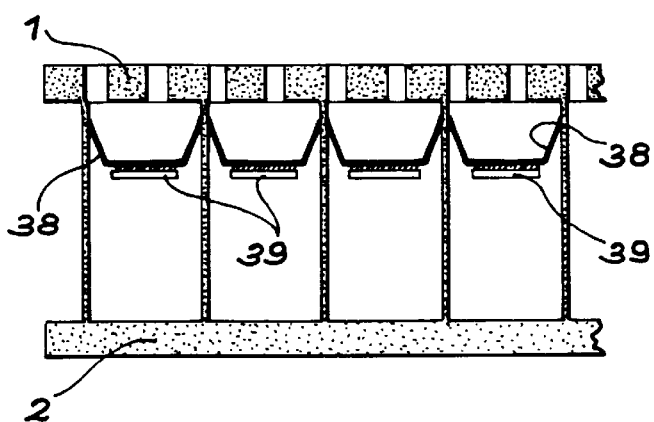
Figure 9:
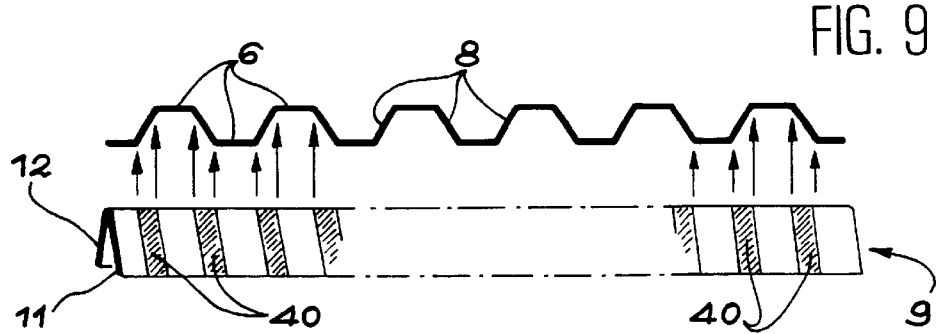

FIGS. 7, 8 & 9 Three supplementary embodiments of the invention.

Thus, a Helmholtz resonator in which the invention can be used consists of a plate formed by a perforated plate or sheet 1 at the front, a plate formed by a solid sheet or plate 2 at the rear, and a honeycomb layer 3, formed from main, thin, foil sheets 4 separating cells 5 intercalated between said plates.

FIG. 2 illustrates two neighbouring, main foil sheets 4, which extend in broken line form with straight edges 6 alternating with oblique edges 8 and are joined and bonded to one another at alternate straight edges 6, whilst being joined to other neighbouring, but not shown main sheets 4 at other straight edges 6. A cell 5 extends between two straight edges 6 of two neighbouring, main sheets 4.

It is possible to see more clearly in FIG. 3 intermediate sheets 9 added to the main sheets 4 and alternating therewith, each sheet 9 being located between two neighbouring, main sheets 4. The intermediate sheets 9 are folded. The fold 10 is intact at the location of the joined together, straight edges 6, so that the intermediate sheets 9 at said location are in the form of two contiguous lips 11 and 12, but is broken elsewhere and the intermediate sheets 9 extend into the cells 5, more particularly forming membranes 13 separating the lips 11 and 12 and sealing the cells 5 whilst subdividing them into two portions. Although other forms are possible and the production process does not always make it possible to obtain such distinct forms, it is possible to distinguish on the membranes 13 a flat, rectangular portion 14 and located between the straight edges 6, as well as two triangular, inclined portions 15 extending between the oblique edges 8 on either side of the flat portion 14 and rising towards the joined together, straight edges 6. The intermediate sheets 9 also have vertical faces 16 bonded to the straight edges 6, and 17 extending in front of the oblique edges 8. Finally, at least one orifice 7 is made through each membrane 13.

The function of the membranes 13 is to compartmentalize the cells 5 serving as an intermediate separating sheet for the honeycomb layers known from the prior art. If the structure is used as a resonance-based sound damper, the membranes 13 are perforated or porous in order to allow the air to communicate between the two portions of the cells 5. They can be of a flexible material (i.e. which deforms under the action of even small forces) or a semi-rigid material (i.e. which only deforms under the action of higher forces, e.g. necessary for opening the cells 5 by laterally pulling on the foil sheets 4, which are initially straight). It is possible to use thin, metal foil sheets, wire gauzes, metal lattices, a flexible membrane, preimpregnated resin sheets, etc. The proportions of the flat portion 14 and inclined portion 15 are not critical, nor is the height position of the membranes 13 in the cells 5. The fold 10 can be oriented towards one or other of the two plates 1 and 2.

The arrangement can be complicated by placing several superimposed, intermediate sheets 9 and which form the same number of membranes 13 in the cells 5, as shown in FIG. 4. Then a Helmholtz resonator with three or more degrees of freedom is obtained.

The production process can be integrated into a conventional honeycomb structure production process. Instead of directly stacking the main sheets 4 on one another, between them are intercalated intermediate sheets 9, which are then longitudinally folded sheets in order to form lips 11 and 12, the fold 10 being continuous. Adhesive is placed on the parts of the main sheets 4 which will form the straight edges 6, alternatively on one face and then the other, in order to join them together, as well as to the parts of the lips 11, 12 of intermediate sheets 9 at these locations.

Adhesive is also deposited on the main sheets 4 in front of the portions of the intermediate sheets 9 which will form the vertical faces 16. When the thus sized sheets 4 and 9 have been stacked and pressed and the adhesive has dried, a lateral tension on the stack of sheets 4 and 9 opens the cells 5 and flattens there the intermediate sheets 9 whilst breaking the folds 10, which forms the membranes 13.

Numerous production variants are possible, starting with those already known from the prior art in connection with honeycomb production. It is in particular possible to use composite materials, which are hardened by baking. If the intermediate sheets 9 are impermeable to the adhesive, the lips 11 and 12 must also be sized in order to adhere them to one another at the locations of the straight edges 6. If they are permeable, porous or preimpregnated with resin, separating sheets must be slid onto the two faces of the lips 11 and 12, at least above and below the locations which will give the membranes 13, to prevent any adhesion at this location, as well as between the lips 11 and 12 at the locations of the vertical faces 16 and 17. These non-adhesive sheets will be removed on opening the cells 5.

The vertical faces 17 may or may not adhere to the oblique edges 8 of the main sheets 4, depending on whether or not they are coated with adhesive. In the affirmative, the structure will be more rigid. If the intermediate sheets 9 are of flexible fabric, they could be coated with hardenable resin at the membranes 13 following the opening of the structure, in order to further stiffen the same.

Other embodiments will now be described. Each continuous strip, intermediate sheet 9 can thus be replaced by isolated elements, whereof one is shown under reference 20 in FIG. 5. This element 20 also comprises a fold 21 and its two halves are symmetrical with respect to the fold line. Their shape is complex and constituted by a trapezium 22, the two trapezia 22 being joined by their large bases at the location of the fold 21 and a rectangle 23 joined to the small base of the trapezium 22. The rectangles 23 are to be adhered to a single straight edge 6 in the manner described hereinbefore. On opening the cells 5, the two trapezia 22 flatten to form a regular hexagon, by breaking the fold 21, which consequently gives a flat membrane 24, illustrated in FIG. 6, sealing one of the cells 5. This permits a more careful construction, without having to worry about folding irregularities as previously was the case, but the shaping proves more difficult. FIG. 5 also illustrates an anti-adhesive sheet 35 slid between the lips of the fold 21 (the halves of the element 20) and two others 36 and 37 entirely covering the trapezia 22. As stated hereinbefore, said sheets 35 to 37 are only useful if the elements 20 are permeable to adhesive or coated with resin. They are removed or drop when the structure of the honeycomb has been finished by the opening of the cells 5.

The intermediate sheets can also be composites. An example is illustrated in FIG. 7 showing that the membranes which they form can comprise a semi-rigid frame 28 and a flexible sheet 29. The latter is on the side of the perforated plate 1 and therefore exposed to the pressure variations due to acoustic vibrations. Thus, it deforms on swinging or flapping in front of the frame 28, which has holes 30 permitting the passage of air to the interior of the cell 5 in response to the flapping of the flexible sheet 29. A supplementary vibration damping is obtained by said air circulation through the holes 30.

At least in this embodiment, it can be useful to perforate the main sheets 4 in order to bring about communication between the cells 5 by orifices 31, so as to equalize the pressure there on the side of the continuous plate 2. Other orifices 32 can be linked to the exterior in order to equalize the pressure in all the cells 5, on either side of the membranes, or in order to blow in a different pressure.

The sound waves striking the flexible sheet 29 do not have a possibility here of traversing it in order to spread out and dissipate in the second portion of the cell 5. This structure is no longer a resonator, but instead an acoustic energy dissipator, which therefore has a similar function. In more general terms, a dissipator may only have the flexible sheet 29. It can also be combined with a resonator. On returning to the construction of FIG. 4, the final intermediate sheet 9, namely that closest to the solid plate 2, could be continuous, whereas the others continue to have orifices to permit the passage therethrough of sound waves.

Another composite sheet variant is shown in FIG. 8. The membrane is formed from a flexible substrate 38, produced from a continuous sheet such as 9 or an isolated element such as 20, as well as a more rigid pellet 39, bonded to the substrate and circumscribed by the membrane and which has the effect of making it more heavy and thus aid its dissipation. Yet another variant, illustrated in FIG. 9, is intended for continuous sheets such as 9 and consists of thickening them at the locations which will face the oblique edges 7. For this purpose reinforcing strips 40 can be bonded to the lips 11 and 12 at the desired locations.

The bonding height of the lips 11 and 12 (at the vertical faces 16) can be close to $$\left(h - \frac{\sqrt{3}}{2}a\right),$$

in which a designates the side length of the hexagons forming the cells 5 and h the height of the cells 5.

What is claimed is:
1. A process for making a honeycomb structure including membranes dividing cells of the structure, comprising the steps of:

a) superimposing main sheets for defining the cells and superimposing lengthwise folded intermediate sheets with said main sheets;

b) adhesively joining each of said main sheets to two adjacent ones of said main sheets at joining portions that are to become straight edges of the cells, and which are separated by free portions that are to become oblique edges of the cells, and adhesively joining portions of said intermediate sheets to straight edges of two adjacent ones of said main sheets with said joining portions separated by free portions; and c) opening the structure by pulling the main sheets apart, and creating the cells of the structure divided by said membranes by unfolding said free portions of said intermediate sheets.

2. A process according to claim 1, wherein the free portions and joining portions alternate lengthwise in the intermediate sheets, the intermediate sheets including a plurality of said free portions.

3. A process according to claim 1, wherein the intermediate sheets comprise one of said free portions and two of said joining potions, said one of said free portions joined to said joining portions, but do not join together said two adjacent ones of said main sheets.

4. A process for making a structure configured to dampen sound waves, including membranes dividing cells of the structure, comprising the steps of:

a) inserting a folded intermediate sheet having two lip portions separated by a fold between two main sheets used to define the cells, the main sheets each comprising at least four connected faces including a first face connected to a second face connected to a third face connected to a fourth face;

b) adhesively joining the first faces of the main sheets to two adjoining lip portions of the intermediate sheet;

c) adhesively joining the third faces of the main sheets to corresponding faces of the intermediate sheet; and d) separating the third faces main sheets from each other and creating the cells by at least partially unfolding portions of the intermediate sheet extending into the cells forming the membranes.

5. A process according to claim 4, wherein free portions of the intermediate sheet alternate between portions of the intermediate sheet which are connected to the main sheets.

6. A process according to claim 4, wherein an intermediate face of the intermediate sheet which is disposed between the faces of the intermediate sheet which are connected to the first and third faces of the main sheet is free from direct adhesion to the main sheet.

7. A process according to claim 4, further comprising the step of:

forming an orifice through at least one of said membranes.

8. A process according to claim 4, wherein with respect to the two main sheets:

the first face is directly connected to the second face which is directly connected to the third face which is directly connected to the fourth face.

9. A structure configured to dampen sound waves, comprising:

a plurality of main sheets, the main sheets comprising at least four connected faces including a first face connected to a second face connected to a third face connected to a fourth face, the first faces of two of the main sheets being adhesively joined;

at least one intermediate sheet disposed between said two main sheets and being adhesively connected to the first and third faces of the main sheets, the at least one intermediate sheet extending into a cell formed by the main sheets, and forming a broken fold membrane sub-dividing the cell into multiple compartments.

10. A structure according to claim 9, wherein free portions of the at least one intermediate sheet alternate between portions of the at least one intermediate sheet which are connected to the main sheets.

11. A structure according to claim 9, wherein an intermediate face of the at least one intermediate sheet which is disposed between the faces of the at least one intermediate sheet which are connected to the first and third faces of the main sheet is free from direct adhesion to the main sheet.

12. A structure according to claim 9, wherein with respect to the two main sheets:

the first face is directly connected to the second face which is directly connected to the third face which is directly connected to the fourth face.

13. A structure according to claim 9, wherein the at least one intermediate sheet includes at least one perforation.

14. A structure according to claim 9, wherein the at least one intermediate sheet comprises a porous material.

15. A structure according to claim 9, wherein the at least one intermediate sheet comprises a flexible material.

16. A structure according to claim 9, wherein the at least one intermediate sheet comprises a fabric material.

17. A structure according to claim 9, wherein the at least one intermediate sheet comprises a composite material.

18. A structure according to claim 17, wherein at least one intermediate sheet comprises a continuous flexible layer and a semi-rigid layer including at least one perforation.

19. A structure according to claim 18, wherein the continuous flexible layer and the semi-rigid layer are unjoined.

20. A structure according to claim 17, wherein at least one intermediate sheet comprises a substrate and pellets more rigid than the substrate.

21. A structure according to claim 20, wherein the pellets are located solely at the membranes.

22. A structure according to claim 17, wherein the at least one flexible intermediate sheet includes at least one stiffened portion at the membrane.

23. A structure according to claim 22, wherein the stiffened portion extends between an oblique edge and a straight edge of the two main sheets defining a cell.

24. A structure according to claim 9, wherein each of the plurality of cells includes a plurality of membranes arranged in tiers equal in number to the number of intermediate sheets.

25. A structure according to claim 9, wherein the intermediate sheets are at least as long as the main sheets.

26. A structure according to claim 9, further comprising:

a plurality of cells formed by the main sheets and the intermediate sheet; and a continuous first plate joined to a first edge of the cells and a second plate including at least one perforation joined to a second opposite edge of the cells.

27. A structure according to claim 25, wherein the main sheets form a plurality of cells and include at least one perforation resulting in communication between the cells between the membranes and the continuous plate.

28. A structure configured to dampen sound waves, comprising:

a plurality of main sheets, the main sheets comprising at least four connected faces including a first face connected to a second face connected to a third face connected to a fourth face, the first faces of two of the main sheets being adhesively joined, and the third faces of the two of the main sheets being separated from each other, at least the second, third, and fourth faces of the two of the main sheets forming a cell;

at least one intermediate sheet between the two of the main sheets, each intermediate sheet comprising two sections, each of the two sections comprising a trapezium portion having a large base and a small base, and a rectangle portion, the two sections being joined at the large bases of each trapezium, and the rectangle of each section being joined to the small base of each of the trapezium, the at least one intermediate sheet extending into the cell and at least one of the rectangles of the at least one intermediate sheet adhesively joined to the first faces of the two of the main sheets.

29. A structure according to claim 28, wherein the at least one intermediate sheet includes at least one perforation.

30. A structure according to claim 28, wherein the at least one intermediate sheet comprises a porous material.

31. A structure according to claim 28, wherein at least one intermediate sheet comprises a flexible material.

32. A structure according to claim 28, wherein the at least one intermediate sheet comprises a fabric material.

33. A structure according to claim 28, wherein the at least one intermediate sheet comprises a composite material.

34. A structure according to claim 33, wherein the at least one intermediate sheet comprises a continuous flexible layer and a semi-rigid layer including at least one perforation.

35. A structure according to claim 34, wherein the continuous flexible layer and the semi-rigid layer are unjoined.

36. A structure according to claim 33, wherein a composite intermediate sheet comprises a substrate and pellets more rigid than the substrate.

37. A structure according to claim 31, wherein a flexible intermediate sheet includes at least one stiffened portion.

38. A structure according to claim 37, wherein the stiffened portion extends between an oblique edge and a straight edge of the main sheets defining a cell.

39. A structure according to claim 28, further comprising a plurality of cells, wherein each of the cells includes a plurality of membranes.

40. A structure according to claim 28, further comprising:
a continuous first plate joined to a first edge of the cells and a second plate including at least one perforation joined to a second opposite edge of the cells.

41. A structure according to claim 40, further comprising a plurality of cells, wherein the main sheets include at least one perforation resulting in communication.

* * * * *